Aug. 6, 1946.  J. E. CLEMONS ET AL  2,405,113
RHUMB LINE CALCULATOR OR DISTANCE AND COURSE COMPUTER
Filed April 6, 1944  2 Sheets-Sheet 1

Inventor
John E. Clemons
John G. Nelson
By A. B. Foster
Attorney

Aug. 6, 1946.  J. E. CLEMONS ET AL  2,405,113
RHUMB LINE CALCULATOR OR DISTANCE AND COURSE COMPUTER
Filed April 6, 1944  2 Sheets-Sheet 2

Patented Aug. 6, 1946

2,405,113

UNITED STATES PATENT OFFICE 2,405,113

RHUMB LINE CALCULATOR OR DISTANCE AND COURSE COMPUTER

John E. Clemons, San Antonio, and John G. Nelson, Houston, Tex.

Application April 6, 1944, Serial No. 529,808

2 Claims. (Cl. 235—61)

This invention relates to navigational devices for a man-made structure that may travel by air, land, or water, and has special reference to a navigational device for quickly determining the distance between points identified by latitude and longitude and also for determining the proper direction or azimuth. The proper direction in such case is the course of the rhumb-line. A rhumb-line course crosses all meridians at the same angle, while great circle courses, excepting at the equator, are always changing in reference to meridians and cross no two meridians at the same angle. A further object of the invention is to provide a device whereby the rhumb-line distance between two points on the surface of the globe that lie within the limitations of the computer may be quickly and accurately determined.

A still further object of the invention is to provide a simple device whereby the direction course or azimuth in traveling from one such point to another may be determined.

A further important object of the invention is to provide a device whereby the calculations for rhumb-line distance and course may be made without requiring reference to any tables, such as tables of trigonometric functions, or logarithms.

With the above and other objects in view as will hereinafter be apparent, the invention consists in general of certain novel details of construction, arrangement of scales, and combination of parts hereinafter fully described, as illustrated in the accompanying drawings, and herein specifically claimed.

In the accompanying drawings, like characters of reference indicate like parts in the several views, and:

Figure 1 is a plan view of one side, termed the "back" of the device in its preferred embodiment.

Figure 3 is an edge elevation of the device.

Figure 4 is a section taken on line 4—4 of Fig. 1 of a transparent cursor showing a preferred construction of a slide mounted thereupon, which will be described below.

Figure 2:
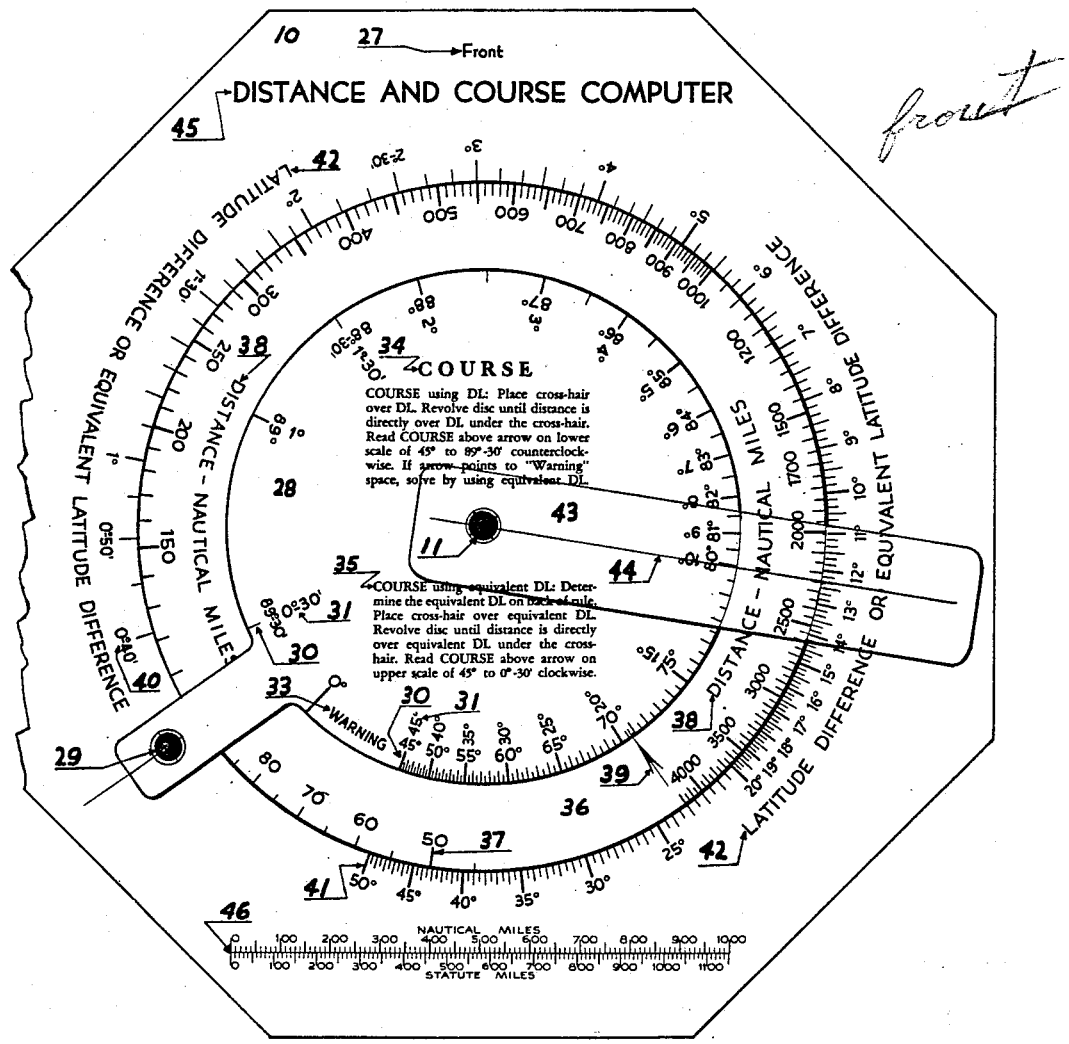
Figure 2 is a plan view of the other side, termed the "front" of the device in its preferred embodiment.

In the construction of this invention, there is provided a flat plate made of suitable material such as (but not restricted to) stiff cardboard, metal or plastic. This may be opaque. This plate is indicated at 10 and has a pivot, 11, located, e. g., centrally thereof.

On the back (i. e., Fig. 1), which is indicated at 9, there is printed a circular scale 12 termed the "Latitude difference or equivalent latitude difference" and so indicated at 13 by those words. It will be observed that this scale runs from 0 degrees to 50 degrees by increasing increments. The periphery of this scale is circumscribed by another scale 14. It will be noted that this latter scale twice circumscribes the inner scale, and on the first revolution it is marked by increasing increments from 0 to 3,000; and on the second revolution it is marked by increasing increments from 3,000 to 4,200. It is indicated at 15 by the words "Rhumb-line distance-nautical miles."

On the centered pivot 11, on the back side of the computer, is mounted a rotatable disc 16, the periphery of which coincides with the markings of the scale 12. This disc is marked with a series of curves 17, running, from 0 degrees to 50 degrees and indicated at intervals as shown by 18. This disc is marked "Longitude difference (from equator to 75°)" by 19. It will be observed that on the disc is further marked at 20, "Navigator must know in degrees and minutes: 1. Difference of latitude DL; 2. Difference of longitude DLo; 3. Mid-latitude ML. Distance: Place arrow 47 of DLo disc over DL. Place slide of ML scale of tab at ML. Revolve tab until ML is directly over DLo. Read Distance under hair-line. Equivalent DL: Place arrow of DLo disc over zero. Place slide of ML scale of tab at ML. Revolve tab until ML is directly over DLo. Read Equivalent DL under hair-line." Pivoted to, and capable of rotation independently of the disc, on pivot 11 on the back side of the computer, is also a transparent cursor 21, having a center line 22 along which, by increasing and decreasing increments 23, are divisions from 0 degrees to 75 degrees. It will be noted that at 24 is marked on this cursor, "Mid-latitude scale." The midlatitude figure is half the sum of the latitudes of the two places (if both are on the same side of the equator). It will be noted at 25 there is a transparent slide with a cross-hair 26, which latter forms a right angle to a center line 22 of the cursor 21. The slide 25 can be moved lengthwise of the cursor 21, toward and away from the pivot 11. This slide is illustrated, in section, in Figure 4. It will be noted that on the periphery of disc 16 there is an index arrow 47.

The other side of the plate is the front thereof and is marked "Front" at 27. On this side of the plate there is mounted a disc 28 which while coaxial with pivot 11 is non-rotatable thereon, the disc being held against rotation by a suitable means such as the rivet 29. On the periphery of disc 28 is a scale 30 of increasing increments from 45 degrees to 89 degrees-30 minutes, which is marked counter-clockwise. Adjacent to and inside of this scale, is a scale 31 from 0 degrees-30 minutes to 45 degrees of decreasing increments which is marked clockwise. These angles represent course of travel. From markings 45 degrees to 0 degrees is a marking "Warning" at 33. On this disc at 34 are also the markings: "Course using DL: Place cross-hair over DL. Revolve disc until distance is directly over DL under the cross-hair. Read Course above arrow on lower scale of 45° to 89°-30′ counter-clockwise. If arrow points to 'Warning' space, solve by using equivalent DL." At 35 are markings "Course using equivalent DL: Determine the equivalent DL on back of rule. Place cross-hair over equivalent DL. Revolve disc until distance is directly over equivalent DL under the cross-hair. Read Course above arrow on upper scale of 45° to 0°-30′ clockwise." Beneath this stationary disc 28 is another disc 36 rotatable on pivot 11 which has markings 37, from 50 to 4,000 of decreasing increments, reading clockwise. This is marked at 38 by "Distance nautical miles." There is an index arrow 39 which points to the periphery of the non-rotatably secured disc 28. About the periphery of the revolving disc 36 is a scale 41 which has markings 40 from 0 degrees-40 minutes to 50 degrees by decreasing increments on the front side 27 of the base 10 of the computer. It is marked at 42 by "Latitude difference or equivalent latitude difference." On pivot 11 is also rotatably mounted, over the above discs, and independently movable, a transparent cursor 43, having a center line 44. On base 10 on side marked "Front" 27 are markings 45 "Distance and course computer," and at 46 is a conversion scale of statute and nautical miles.

We may now illustrate the operation and use of the instrument.

PROBLEM No. 1

Solve for the rhumb-line distance and course—
From: Honolulu, (21°-25′ N. lat., 157°-35′ W. long.).
To: Santa Ana, Calif., (33°-45′ N. lat., 117°-50′ W. long.).

With all problems, three things must be known in order to operate the computer.

1. Difference of latitude in degrees and minutes (DL).
2. Difference of longitude in degrees and minutes (DLo).
3. Mid-latitude in degrees and minutes (ML).

Problem No. 1 deals with a trip (e. g., by airplane) from Honolulu to Santa Ana, California:

Difference of latitude, 12°-20′ (DL).
Difference of longitude, 39°-45′ (DLo).
Mid-latitude, 27°-35′ (27.6°) (ML).

1. Solve for Distance as illustrated in Figure 1 of the drawings.

Rotate the disc 16 until the arrow 47 of longitude disc 16 (back side of computer) is over 12°-20′, the difference of latitude. Place slide of the mid-latitude scale at the mid-latitude of 27°-35′. Revolve the cursor 21 until the mid-latitude is directly over the difference of longitude of 39°-45′ of the longitude disc 16. Read Distance on the inner distance scale on the base 9 beneath the hair-line 22 of the cursor 21. This distance is 2,245 nautical miles.

2. Solve for Course on front side 27 of the computer as illustrated in Figure 2. Rotate the cursor 43 to bring the hair-line 44 over the difference of latitude (12°-20′) on the scale 41. Then revolve the disc 36 until the distance of 2,245 is directly under the hair-line 44, the latter standing over 12°-20′ on scale 41. Read the Course above the arrow 39 of 70¾° on the scale 30. Since the direction of flight is north and east the True course is 70¾°.

Figures 1 and 2 of the drawings show the parts in this relation.

PROBLEM No. 2

Solve the rhumb-line distance and course—
From: Panama, (8°-55′ N. lat., 79°-30′ W. long.).
To: St. Louis, Mo., (38°-30′ N. lat., 90°-15′ W. long.).

Difference of latitude, 29°-35′ (DL).
Difference of longitude, 10°-45′ (DLo).
Mid-latitude, 23°-42½′ (23.7°) (ML).

1. Solve for distance in the same manner as in Problem No. 1 by bringing the arrow 47 of the longitude disc opposite 29°-35′. Then adjusting mid-latitude reading 23.7°, on the cursor 21 over the difference of longitude 10°-45′ reading the distance of 1,869 nautical miles under the hair-line of the cursor 21 on the rhumb-line distance scale.

2. In solving for Course in the same manner as in Problem No. 1 by placing the distance of 1,869 over DL (difference of latitude) of 29°-35′ we find that the arrow points to "warning." Therefore course must be solved by using the Equivalent difference of latitude.

3. The Equivalent difference of latitude is solved on the back side of the computer. Place the arrow of the difference of longitude disc over zero. Place the slide of the mid-latitude scale at mid-latitude of 23°-42½′. Revolve cursor 21 until the mid-latitude of 23°-42½′ is directly over the difference of longitude of 10°-45′. Read the Equivalent difference of latitude of 9°-45′ beneath the cross-hair 26, on the slide.

4. Solve for Course on the front 27. Rotate the cursor 43 to bring the cross-hair 44 over the equivalent difference of latitude of 9°-45′. Revolve the distance disc 36, and read 1,869 directly under the cross-hair while the latter is still over 9°-45′. Read Course of 18¼° above arrow on the inner scale of 45° to 0°-30′ clockwise. Since the flight is north and west the True Course is found by subtracting 18¼° from 360° and is 341¾°.

Due to fineness of graduation on rule, short courses are difficult to read when the given latitude and longitude differences are used. For accurate solution, multiply the longitude and latitude differences (not mid-latitude) by some convenient factor and divide the answer by the factor.

*Example*

| | |
|---|---|
| DL (difference of latitude) | 1°-30′ |
| DLo (difference of longitude) | 3°-0′ |
| Mid-latitude | 35°-0′ |

Using a factor of 10, we have:

| | |
|---|---|
| DL | 15°-0′ |
| DLo | 30°-0′ |
| Mid-latitude | 35°-0′ |

Using DLo—30°-0′—and proceeding as in Problem No. 1 we get a distance reading of 1,727 nautical miles. This, divided by factor 10 gives us 172.7 nautical miles. For course, place 172.7 over 1°-30′ and read a course of 58½°.

To determine the Equivalent DL where the DLo is extremely small, such as 0°-7′: Using a factor of 10 gives 70′ or 1°-10′ which is under 5° and still is not easily read. Therefore in this example a factor of 100 is suggested giving 700′ or 11°-40′. Now assuming a ML of 30° we read an equivalent DL of 10°-20′ (620′) and dividing by 100 gives 0°-6.2′, the true Equivalent DL. Now multiply both the true distance and the Equivalent DL by 10 in this example which give an Equivalent DL of 62′ or 1°-2′ and solve for course which will be between 0°-45′.

LEGENDS

The legend shows the course angle obtained by the instrument. Thus:

If flying in the southwesterly quadrant, the azimuth is obtained by adding 180° to the reading of the computer.

If flying in the northwesterly quadrant, the azimuth is obtained by subtracting the reading from 360°.

If flying in the southeasterly quadrant, the azimuth is obtained by subtracting the reading from 180°.

If flying in the northeasterly quadrant, the computer reading is the azimuth.

To explain the use of distance scale 14 reading from zero to 3,000 nautical miles and from 3,000 to 4,243 nautical miles: The setting of the mid-latitude cursor 21 is always assumed to start at zero miles to be swung in clock-wise direction until an intersection is had with the difference of longitude reading and mid-latitude reading. When this intersection is had within the first revolution or 360°, the reading is between zero and 3,000 nautical miles. When an intersection of the mid-latitude and mid-longitude scales is had on the second revolution or between 360° and 720°, the reading is somewhere between 3,000 and 4,243 nautical miles.

In the above description cursors 21 and 43 are described as transparent and carrying lines 22 and 44 which extend from the center of the pivot 11. But it will be understood that the cursors could be opaque, one edge of the cursor being in line with the center of pivot 11. We do not wish to restrict invention to transparent cursors.

What is claimed as new is:

1. A navigational instrument comprising a flat base member provided with a center pivot, a revolvable disc on said pivot, said disc having thereon a series of spirals indicating longitude distances, a rotary cursor on said pivot and having a scale of graduations indicating mid-latitude, a second scale having divisions indicating latitude differences or equivalent latitude differences on said base member and surrounding the periphery of said disc, and a third scale having divisions indicating rhumb-line distances in nautical miles on said base member outside of and surrounding said second scale.

2. A navigation instrument comprising a flat base, a pivot thereon, a disc revolvable on said pivot, said base carrying a scale surrounding the periphery of said disc and indicating latitude difference or equivalent latitude difference, said base also having a second scale surrounding the first mentioned one and indicating rhumb-line distance in nautical miles, said revolvable disc having thereon a series of curves indicating longitude differences and a pointer to coact with the first mentioned scale, a rotary cursor mounted on said pivot to coact with said second mentioned scale, said cursor carrying a mid-latitude scale to coact with said curves, and a slide on said cursor to coact with said mid-latitude scale and said curves.

JOHN E. CLEMONS.
JOHN G. NELSON.